United States Patent [19]

McIntyre

[11] Patent Number: 5,638,429

[45] Date of Patent: Jun. 10, 1997

[54] CHARGE CODE ENTRY IN PREPROGRAMMED DIALING

[75] Inventor: Lloyd F. McIntyre, Plano, Tex.

[73] Assignee: Xerox Corporation, Stamford, Conn.

[21] Appl. No.: 402,279

[22] Filed: Mar. 10, 1995

[51] Int. Cl.$^6$ ............................................. H04M 11/00
[52] U.S. Cl. .............................. 379/100; 358/434; 358/440
[58] Field of Search ................................ 379/100, 112, 379/114, 216, 355; 358/434, 438, 440, 442, 443

[56] References Cited

U.S. PATENT DOCUMENTS

| | | | |
|---|---|---|---|
| 3,597,071 | 8/1971 | Jones | 355/3 |
| 4,623,244 | 11/1986 | Andrews et al. | 355/24 |
| 4,947,345 | 8/1990 | Paradise et al. | 364/519 |
| 5,021,892 | 6/1991 | Kita et al. | 358/468 |
| 5,038,218 | 8/1991 | Matsumoto | 358/296 |
| 5,325,421 | 6/1994 | Hou et al. | 379/112 |

*Primary Examiner*—Stella Woo
*Attorney, Agent, or Firm*—Mark Costello

[57] ABSTRACT

A user interface is provided facilitating the entry of at least one destination phone number into a phone number dialing routine. Upon entry of the phone number, the user interface allows a Start command, causing the phone number to be dialed by transmitting appropriate signals to a switching exchange. In the event a charge code is required, the user interface provides for separate entry for charge codes. A controller concatenates the phone number and the charge code number with appropriate timing inserted to allow the switching exchange to utilize the number and charge code.

6 Claims, 4 Drawing Sheets

CHARGE CODE ENTRY IN PREPROGRAMMED DIALING

The present invention is directed to a multifunctional device including the capability of dialing a phone number with a separated entry of charge codes.

BACKGROUND OF THE INVENTION

Standard facsimile devices which operate only as facsimile machines connected directly to a telephone line are rapidly being replaced by devices which combine facsimile and/or digital scanning, copying and printing in one single unit. Note, e.g., U.S. Pat. No. 4,947,345 to Paradise; U.S. Pat. No. 3,597,071 to Jones; U.S. Pat. No. 5,038,218 to Matsumoto; U.S. Pat. No. 5,021,892 to Kita, et al.; and U.S. Pat. No. 4,623,244 to Andrews, et al. One class of these devices may conveniently be directly connected to a personal computer or workstation to provide printing, and to a telephone access line to provide facsimile transmission and receipt.

In the case of a facsimile transmission, a data coupler or line interface and modem is required to access a telephone line and transmit an appropriate sequence of tones to "dial" a desired phone number. In the case of many private PBX's or network provider services (hereinafter "PBX"), upon dialing a desired number, the PBX often requires the entry of a charge code, typically responding to the call with a tone or message indicating the charge code requirement. This charge code ensures that a user has the right to access the telephone system in the manner intended by the dialed phone call, and is also commonly used to identify the user for billing purposes.

In a common PBX system, for the entry of an outgoing facsimile phone number, users anticipate the requirement of the charge code, and may enter the phone number in the format XXX-XXX-XXXXpauseXXXX. A pause button or function is provided at the facsimile machine which causes the modem to insert a time delay of a predetermined duration into the generation of tones for dialing in a sequence that separates the phone number from the charge code. Thus, the PBX 1) "hears" the phone number, 2) generates a charge code request tone, and 3) hears the charge code. The transaction appears to the PBX as if the number and charge code had been manually entered. In many devices including facsimile functions, this is the only way to enter the charge code, i.e., upon entering a phone number, there is no way to manually add a dialing sequence corresponding to the charge code.

Charge codes are desirably highly customized. In many organizations, each telephone user will have a charge code. In other organizations, charge codes are assigned to projects or clients or departments for specific billing purposes. Problems arise in the current charge code dialing scheme in two areas: one touch dialing and activity reports.

One touch dialing or speed dialing or quick dialing, is a highly desirable feature in a telephone based system, because it enables a user to select a pre-programmed telephone number with the entry at a key pad or user interface of a one or two digit dialing code entry. The entry of the dialing code provides a pointer to a location in memory where a full telephone number resides. For commonly dialed phone numbers, this features avoids the need to look up the number, or dial the relatively large number of digits comprising a phone number. In the previously described charge code situation, a pre-programmed number conveniently includes appropriate pauses and charge codes. For convenience these pre-programmed numbers are limited to a relatively small number.

Unfortunately, once a quick dial phone number is programmed with a charge code, every user is enabled to use that charge code, even if the use of the charge code would be inappropriate. For example, a law firm may have a quick dial entry for another law firm. The charge codes should reflect project or client codes. In the described quick dial situation, however, this will not be true.

Activity reports are often desired in a facsimile system to maintain records of facsimile transmission times, durations, destinations and failure codes. It is extremely common for these reports to automatically print out after a preselected number of transmissions, or to be printable upon demand. Unfortunately, these activity reports consider the telephone number to include every digit dialed at the entry of the number. Thus, the charge codes are included in the reports. It would be quite simple for a dishonest user to walk up to any facsimile machine and gather charge codes for later illegal use. The user could accomplish a facsimile transmission with the use of an inappropriate charge code, and thus corrupt the objectives of the charge code.

References disclosed herein are incorporated by reference for their teachings.

SUMMARY OF THE INVENTION

The present invention is directed to a facsimile transmission arrangement with a charge code entry arrangement that allows charge code entry separately or independently from a telephone number, and maintains confidentiality of the charge codes entered.

In accordance with one aspect of the invention, there is provided a device including a facsimile transmission function. In such a device, a user interface is provided facilitating the entry of at least one destination phone number into a phone number dialing routine. Upon entry of the phone number, the user interface allows a Start command, causing the phone number to be dialed by transmitting appropriate signals to a switching exchange. In the event a charge code is required, the user interface provides for separate entry for charge codes. A controller concatenates the phone number and the charge code number with appropriate timing inserted to allow the switching exchange to utilize the number and charge code.

In accordance with another aspect of the invention, the device stores dialing information for later reproduction in a report form. The stored dialing information includes only such information as was originally entered for the destination phone number. The report does not include charge code numbers sent to the switching exchange.

In accordance with another aspect of the invention, the user interface accommodates storage of destination phone numbers for subsequent use in one touch dialing. In such an arrangement, the stored telephone number may: a) include a dialing code which is universally used whenever the one touch number is accessed; or b) set a flag that causes the user interface to provide a message prompting the user to enter a charge code.

These and other aspects of the invention will become apparent from the following description, the description being used to illustrate a preferred embodiment of the invention when read in conjunction with the accompanying drawings in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
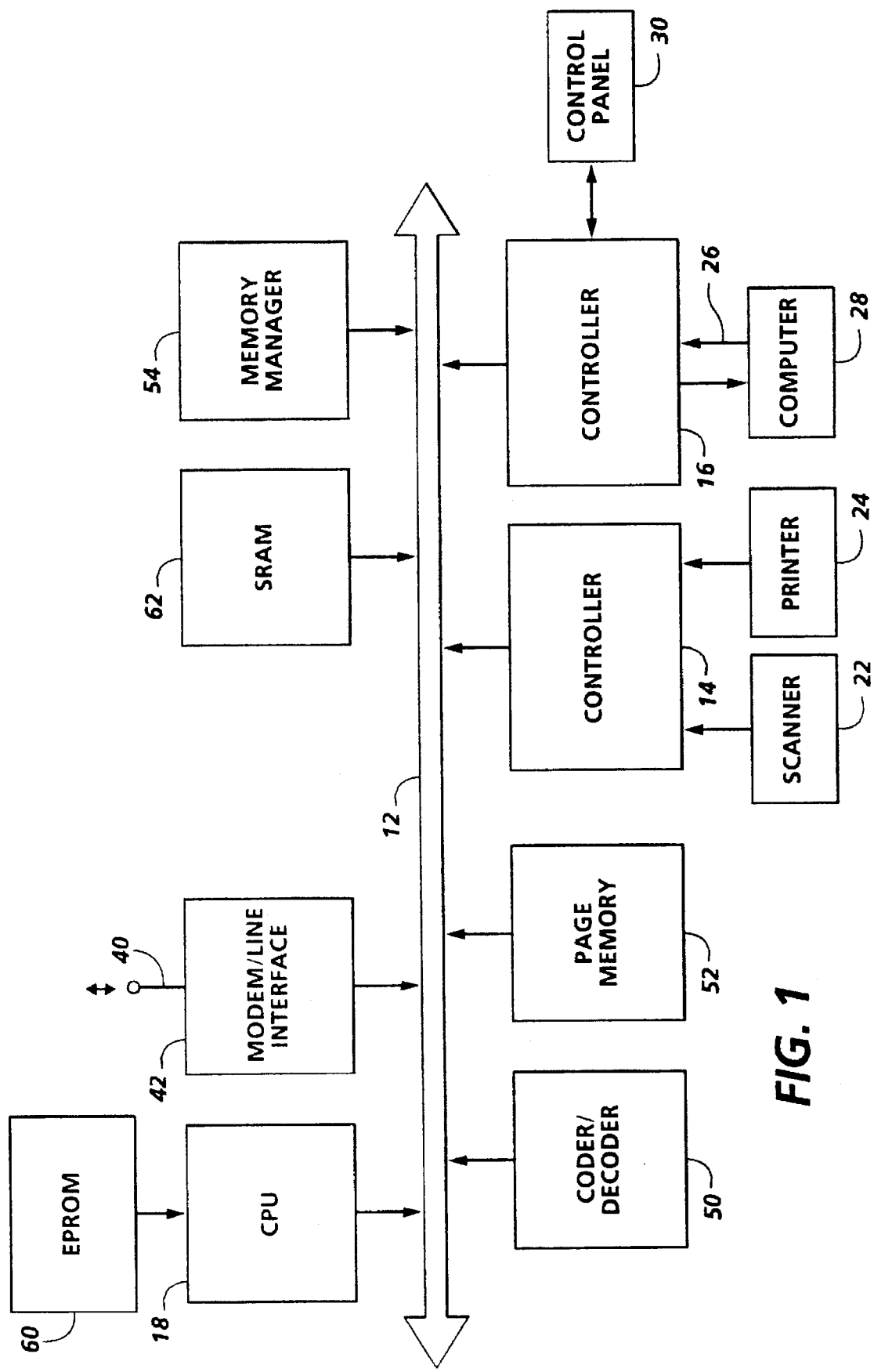
FIG. 1 is a block diagram depicting a multifunctional document processing system.

Referring to FIG. 1, a multifunctional document processing system is referenced generally as numeral 10. A system bus 12 provides for communication between components. Device control is distributed between two programmable controllers, hereinafter first controller 14 and second controller 16. A central processing unit (CPU) 18 includes a third programmable controller serve to provide control of the overall system processing. Scanner 22 and printer 24 are connected to the system via first processor 18. The printer 24, generates whatever hard copy is required. In one embodiment, this printer is an ink jet printer. Scanner 22 is included to provide full facsimile and/or copier functions. The system is operative to process electronic document signals directed thereto via second controller 16 by serial, parallel or SCSI connection 26 from an external personal computer or workstation 28. Second processor 16 may support an additional outward connection 29 from the system to the personal computer 28 for passing scanned data thereto. Second controller 16 additionally provides control for a user interface/control panel (UI) 30 for the system. Second controller 16 also receives the outputs of the systems machine sensors, and provides control of the mechanical components of the system, and particularly the paper transport systems. It will no doubt be appreciated that instead of a personal computer, a network connection or network server could be substituted, to provide network operation.

Facsimile communication is provided for system 10 via a telephone line 40 and fax modem 42. Decoding and encoding of facsimile transmissions is provided by coder/decoder 50. Page memory 52 is provided, having storage capability for storing electronic document signals corresponding to at least several pages. Conveniently, it is DRAM-type memory. Access to the memory is controlled by memory manager 54, which in turn is controlled by CPU 18.

Programming information is stored in EPROM 60, and SRAM 62.

One possible embodiment of the invention allows the use of CPU 18 to control access to a data bus 12, on which image information and control information flow. In such an arrangement, a facsimile transmission can be received by the document process system 10 at telephone line 40 and fax modem 42, and directed either directly to printer 24, via first controller 14, or to page memory 52. Information stored at page memory 52 can be directed to printer 24. Information from computer 28 can be directed via connection 26 to second controller 16 to either page memory 52 or printer 24. Scanned data from scanner 22 can be directed via first controller 14 either to page memory 52 (which is particularly useful in the case of precollation) or to printer 20.

Figure 2:
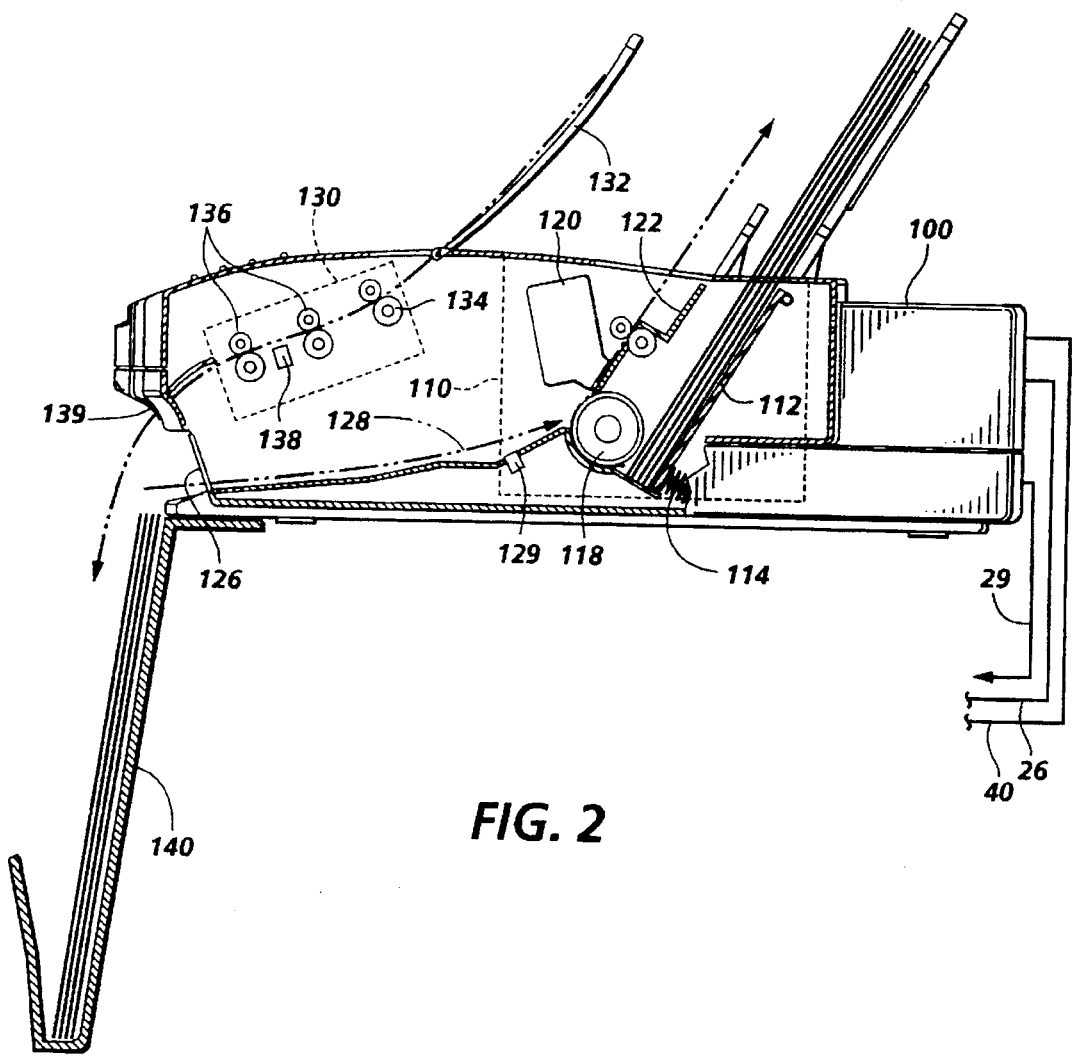
FIG. 2 is a schematic view of a multifunctional document processing device contemplated to incorporate the present invention.

With reference now to FIG. 2, a highly simplified and schematic view of the machine is illustrated. Within housing 100 is supported the circuits described in FIG. 1, a scanner, printer, paper transports and appropriate connections to external functions. Within dotted line 110 are illustrated the mechanical elements of printer 24. Included are input paper tray 112, with an appropriate tray elevator 114. For printing, sheets are fed from tray 112 by a roll feeding arrangement 118, which advances sheets from the tray. As the sheet is wrapped past feed roller 118, an ink jet printing system 120 deposits ink in image configuration a swath at a time. Further details with respect to thermal ink jet printing devices are available at U.S. Pat. No. 4,638,337 to Torpey et al., and U.S. patent application Ser. No. 08/081,898 entitled, "Method and Apparatus for Maintaining Constant Drop Size Mass in Thermal Ink Jet Printers," by J. Stephany which illustrate a multi-color ink jet printer. Upon completion of printing, the documents continue to advance until they are deposited in output tray 122.

For printing on stock which is not suitable for stacking in input paper tray 112, a bypass path is provided, entering the machine at bypass entry 126. A sheet path 128 is defined by paper guides (not shown). In this embodiment, stock is manually inserted until it is engaged at the feed roller 118. A sensor 129, senses the presence of bypass stock and signals controller 16 (FIG. 1) to start operation of the feed roller for advancing the stock past the printer.

Within the dotted line 130, are illustrated the mechanical components of the scanner 22. Included are input document tray 132, with retard feeder 134, feeding documents seriatim from tray 132. Documents are advanced to CVT arrangement 136, whereat the documents will be pass a full width scanning element, with appropriate illumination and optics, indicated generally by 138. The scanned documents are directed to an exit 138, from which they are gravity stacked in an output document tray 140.

Figure 3:
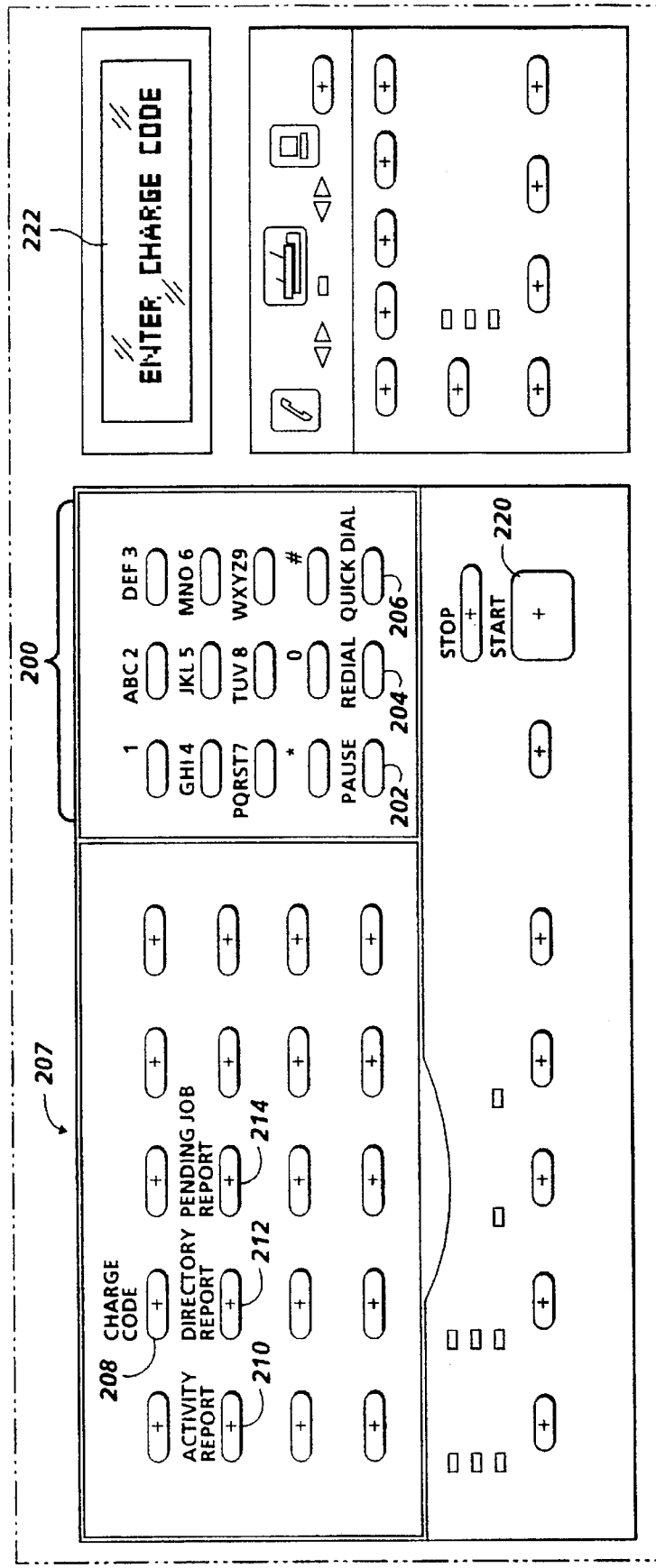
FIG. 3 illustrates a user interface controlling the charge code scheme in the document processing machine.

With reference now to FIG. 3, there is shown a relevant portion of UI 30 useful in the present invention. Area 200 supports a standard telephone keypad of entering a telephone number to be dialed with buttons representing digits 0–9, * and #. In a preferred embodiment, the same area supports buttons representing Pause (202), Redial (204), and Quick Dial (206). Quick Dial button 206 provides access to stored telephone numbers, and acts as a prefix for the one or two digit number to access the stored telephone number. Of course, if it is desired, Quick Dial can also access a group of phone numbers, as well. Programmed phone numbers are conveniently stored in SRAM 62. At the time of dialing, phone numbers are temporarily stored to DRAM (page memory 52).

The area designated generally as 207 provides many of the the function control buttons for UI 30. Charge code button 208 allows entry of a distinct charge code number at the system. Charge codes may indicate a billing account or a personal identification providing access to the PBX or phone system. Activity Report button 210 provides a command to CPU 18 to generate a listing of phone numbers sent and received by the system. Directory report button 212 provides a command to the CPU 18 to generate a list of phone numbers stored in memory for Quick Dial. Pending job report button 214 provides a command to the CPU 18 to generate a listing of jobs and programming therefor, which are pending. Directory setup button 216 causes the controller to enter a phone director programming mode, to store phone numbers for access via the One Touch or Quick Dial feature.

Start button 220 starts the facsimile machine process, causing the numbered entered at the key pad to be entered. Alphanumeric prompts are displayed at UI display 222.

Figure 4:
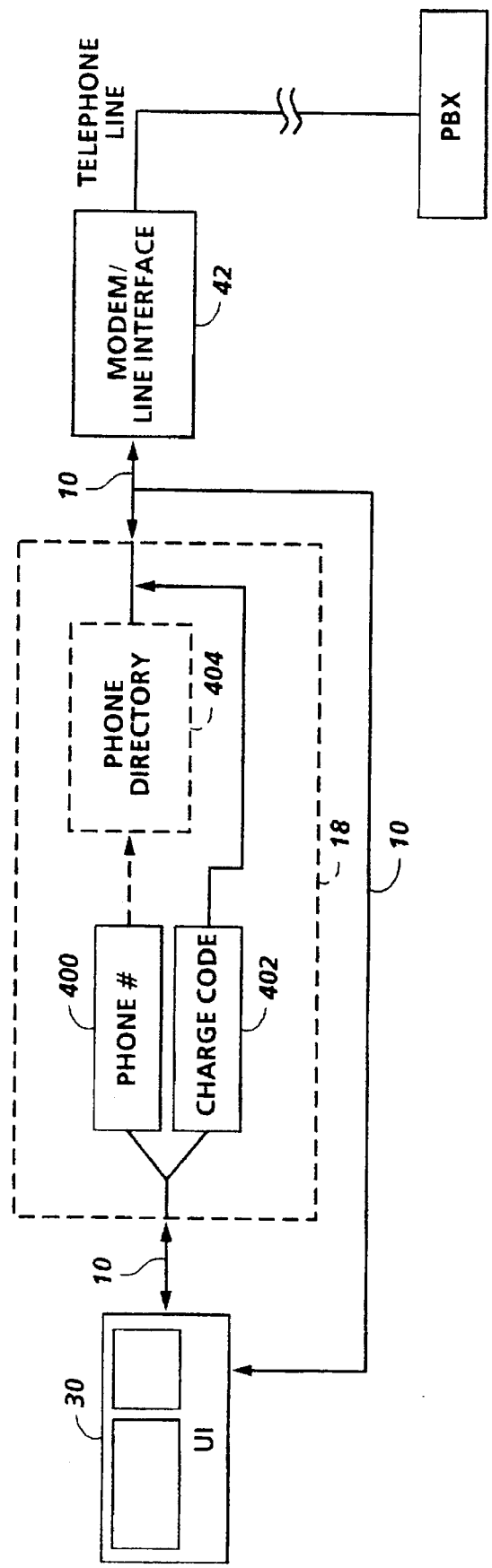
FIG. 4 illustrates a functional block diagram illustrating the operation of the invention.

In accordance with the invention, with reference now to FIG. 4, a functional block diagram of the system is illustrated. Dialing information and charge code information is entered at UI 30. UI 30 is connected (via controller 16, not shown in FIG. 4) to CPU 18. Because dialing information and charge code information are entered distinctly at user interface 30, CPU 18 can easily store the values in separate internal memory areas, perhaps latches 400 and 402 or in page memory 52. Shown in dotted line as an optional condition, if Phone# was preceded by the Quick Dial signal, then Phone# is used as a pointer to a phone directory 404, also stored in memory for a stored telephone number. Controller 18 directs both the telephone number and charge code to modem/line interface 42, which converts the digital signals directed thereto to analog signals suitable for use on the phone line, which directs the phone number and charge code to a switching exchange or PBX.

As noted, there is nothing preventing a telephone number stored in phone directory 404 from including a charge code. In many circumstances this will be the most convenient option. However, it may be desirable to indicate to a user whether or not this is the case. In such a situation, at the time of programming the quick dial number into phone directory 40, an optional flag can be set (in a preferred embodiment this is done by touching the charge code button 208 during the programming step, and leaving this charge code field empty) which indicates that before the number can be dialed, a charge code must be entered into the system. This sets a system flag which causes a message indicating as much to appear at the alphanumeric display 222.

With respect to report generation, Activity Report button 210 provides a command to CPU 18 to generate a listing of phone numbers sent or received by the system. Directory report button 212 provides a command to the CPU 18 to generate a list of phone numbers stored in memory for Quick Dial. Pending job report button 214 provides a command to the CPU 18 to generate a listing of jobs and programming therefor, which are pending. For all these reports, CPU 18 looks only to a listing of phone numbers stored at SRAM 62 for inclusion in the report.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A multifunctional document processing system having a facsimile mode, including:

a modem, converting digital telephone number signals and charge code signals to a format suitable for transmission on a telecommunication line, responsive to telephone number signals and charge code signals directed thereto;

a user interface at which commands and data are entered for controlling facsimile transmission, including a telephone number entry selector and a charge code entry selector, said telephone number entry selector and a charge code entry selector each operable by a user independently of the other to generate commands and receive data to complete a facsimile transmission;

a controller responsive to user interface-entered commands and data to direct telephone number signals and charge code signals to said modem, concatenating said telephone number signals and charge code signals to generate a combined signal to the modem, whereby a modem transmission includes both telephone number signals and charge code number signals.

2. The multifunctional document processing system as described in claim 1 including an historical memory, receiving telephone number information free of charge code information, from the controller for subsequent report generation or display.

3. The multifunctional document processing system as described in claim 1 including:

a telephone number memory, storing telephone numbers, accessible by entry of a retrieval code value at the telephone number entry selector;

said user interface receiving programming commands to enter said telephone numbers indexed by said code values; and indicia in said telephone number memory, programmable therein to indicate a charge code requirement, and causing said controller to generate a message at said user interface indicating that a charge code must be entered into the charge code entry selector.

4. A document processing system having a facsimile mode, including:

means for directing signals representing a telephone number and a charge code onto a telecommunications medium for eventual use by an external switching exchange;

a user interface, allowing independent entry of telephone numbers and charge codes;

a controller responsive to user interface-entered telephone numbers and charge codes to cause said signal directing means to direct signals onto said telecommunication medium, concatenating said telephone number signals and charge code signals to generate a combined signal to the signals directing means, whereby the signal includes both telephone numbers and charge code number.

5. The document processing system as described in claim 4 including an historical memory, receiving telephone number information from the controller without concurrent charge code information, subsequent report generation.

6. The document processing system as described in claim 4 including:

a telephone number memory, storing telephone numbers, accessible by entry of a code representative thereof at the user interface;

said user interface receiving programming commands to enter said telephone numbers into the telephone memory, indexed by said representative code; and indicia in said telephone number memory associated with a telephone number, programmable therein to indicate a charge code requirement, and causing said controller to generate a message at said user interface indicating that a charge code must be entered at the user interface upon entry of a code representing a telephone number associated with said indicia.

* * * * *